Patented June 25, 1946

2,402,643

UNITED STATES PATENT OFFICE 2,402,643

CHEMICAL PROCESSES

Wilbur A. Lazier, Frank K. Signaigo, and James H. Werntz, Wilmington, Del., assignors to E. I. du Pont de Nemours & Company, Wilmington, Del., a corporation of Delaware No Drawing. Application September 18, 1941, Serial No. 411,336

28 Claims. (Cl. 260—609)

This invention relates to a catalytic process, and more particularly it relates to a process for the production of thiols. More specifically, this invention relates to a process for converting sulfurized ethylenic compounds to thiols.

For many years aliphatic thiols and many other compounds containing one or more thiol groups have been recognized as an important class of organic intermediates having a wide variety of potential uses in industry. Nevertheless, the development and commercial utilization of simple and substituted aliphatic thiols has been seriously hampered, except in a few isolated instances, either by lack of suitable low-cost raw materials or practical methods of manufacture. It has been proposed, for example, to produce thiols by the interaction of organic halogen compounds and sodium hydrosulfide or sodium thiosulfate, and although in several instances, particularly in the synthesis of primary thiols, this method gives good results, its commercial scope has been limited both by the high cost and relative scarcity of suitable halogen compounds. Similarly, the literature contains disclosures of a method for the synthesis of thiols involving addition of hydrogen sulfide to ethylenic compounds. This process is also limited in scope and yield performance. Hence, the discovery of a novel and practical catalytic synthesis of both mono- and dithiols from low-cost, readily available raw materials according to the process of this invention comprises an important and valuable advance in the field of sulfur chemisty.

It is an object of this invention to provide a new and improved process for the production of thiols. Another object is to provide a process for producing thiols from sulfurized ethylenic compounds. Still another object is to provide a new and improved process for producing thiols by a catalytic method. Other objects will be apparent from the following description of the invention.

These objects are accomplished by the following invention which comprises bringing sulfurized ethylenic compounds, either in the liquid or vapor phase, into contact with hydrogen under a pressure of at least 10 atmospheres at a temperature above about 75° C. but below 300° C., in the presence of a sulfactive hydrogenation catalyst.

The exact manner of practicing this invention will vary with the particular compounds processed; however the following will illustrate its application. One hundred parts of a sulfurized ethylenic compound, either alone or dissolved in a suitable solvent, is mixed with 5 to 15 parts of a sulfactive hydrogenation catalyst of the type represented by cobalt and nickel sulfides and charged into a high pressure reaction vessel equipped with an inlet for hydrogen and an efficient device for agitation. Hydrogen under pressure is admitted to the vessel until the total pressure is above about 10 atmospheres and preferably in the neighborhood of 150 atmospheres, and the mixture is heated to between about 75° C. and 300° C. and generally between about 100° C. and 200° C. Under these conditions hydrogen is absorbed smoothly and, if necessary, additional amounts are added from time to time to maintain the pressure within a suitable working range. The absorption of hydrogen is usually complete within 2 to 5 hours. The reaction vessel is cooled to room temperature, purged to eliminate the hydrogen sulfide produced in the reaction, and the product is removed, filtered to separate the catalyst, and refined by fractional distillation or by any other appropriate method. According to this process, sulfurized ethylenic compounds are converted smoothly in good yields to thiols.

The preferred embodiments of the invention are illustrated by the following examples in which the proportions of reactants, catalyst, etc., are referred to in terms of parts by weight unless otherwise stated.

Example I

Twenty-eight parts of sulfurized pentadecene-7 containing approximately three atoms of sulfur per mole, 60 parts of toluene, and 3 parts of cobalt polysulfide catalyst, prepared as described in the copending application of F. K. Signaigo, Serial No. 319,241, filed February 16, 1940, are charged into a steel, high-pressure autoclave provided with an inlet for hydrogen and a device for agitating the contents thoroughly. Hydrogen is admitted to the autoclave from high pressure storage tanks until the total pressure is within the range of 2000 to 2500 lbs. per square inch, and the vessel is heated to about 160 C. The hydrogenation is continued under these conditions for about four hours. The drop in pressure is negligible, but on cooling and opening the reaction vessel, a substantial amount of hydrogen sulfide is given off. The toluene solution of the crude hydrogenation product is filtered to separate the catalyst and distilled in a precision fractionating still. There are obtained 3.8 parts of unreacted hydrocarbon; 10.2 parts of pentadecanemonothiol, B. P. 173° to 174° C.

at 16 mm.; 5.4 parts of pentadecanedithiol-7,8, B. P. 196° to 197° C. at 16 mm.; and 3.6 parts of high-boiling tarry residue. The monothiol fraction presumably consists of a mixture of pentadecanethiol-7 and pentadecanethiol-8.

Example II

One hundred fifty parts of sulfurized pentadecene-7, presumably containing substantial amounts of the thio-ozonide, $C_{15}H_{30}S_3$, and free from solvents, is mixed with 12 parts of precipitated cobalt polysulfide catalyst, prepared as described in the copending application of F. K. Signaigo, Serial No. 319,242, filed February 16, 1940, and treated with hydrogen under 2000 lbs. per square inch pressure at 150° to 160° C. A pressure drop of 1200 lbs. is recorded during 3 hours, and on cooling the vessel, purging to remove hydrogen sulfide, and filtering the product to separate catalyst, there is obtained 115 parts of light yellow oil with a faintly disagreeable odor. On distilling this product there are isolated 12.6 parts of unreacted hydrocarbon, 59.3 parts of pentadecanemonothiol, 29.7 parts of pentadecanedithiol, and 9.5 parts of high-boiling residue.

Example III

One hundred fifty parts of sulfurized pentadecene-7 prepared by treating pentadecene-7 with two atomic proportions of sulfur at 150° to 160° C. is charged into a steel, high-pressure, hydrogenation autoclave with 15 parts of cobalt polysulfide catalyst, prepared as described in the copending application of F. K. Signaigo, Serial No. 319,241, filed February 16, 1940, and heated to a temperature of 160° C. Hydrogen under 2000 lbs. per square inch pressure is admitted to the vessel, and under these conditions a smooth reaction is obtained as evidenced by a pressure drop of approximately 800 lbs. during a period of about 3 hours. After cooling the autoclave, the product is removed and filtered to separate the catalyst. The crude hydrogenated material consists of a limped yellow oil having the characteristic odor of long-chain thiols. Fractional distillation of the product yields some unreacted hydrocarbon suitable for resulfurization, 52.9 parts of pentadecanemonothiol, and 24.3 parts of pentadecanedithiol.

In a similar manner hexadecanethiols are obtained from cetene-1 by sulfurization with free sulfur followed by hydrogenation over a sulfactive catalyst.

Example IV

Seventy-eight parts of sulfurized product prepared from a mixture of alicyclic terpenes obtained as by-products in the synthesis of camphor is dissolved in 100 parts of benzene and hydrogenated at 160° C. under pressures of 1800 to 2400 lbs. per square inch using about 8 parts of precipitated cobalt polysulfide catalyst, prepared as described in the copending application of F. K. Signaigo, Serial No. 319,242, filed February 16, 1940. Under these conditions, the absorption of hydrogen proceeds smoothly, and a total pressure drop of about 600 lbs. is recorded during 3 hours. The crude reaction product is removed from the autoclave, filtered to separate the catalyst, and blown with nitrogen to remove hydrogen sulfide. Evaporation of the solvent under diminished pressure yields 42 parts of viscous oil consisting mainly of thiols.

Example V

Fifty-six parts of sulfurized oleic acid obtained by heating a mixture of oleic acid and 3 atomic equivalents of sulfur at 150° to 160° C. is dissolved in 100 parts of benzene and charged into a hydrogenation autoclave together with 6 parts of cobalt trisulfide catalyst prepared as described in the copending application of F. K. Signaigo, Serial No. 319,241, filed February 16, 1940. Hydrogen is then charged into the autoclave to a pressure of 1500 lbs./sq. in. and the autoclave is agitated and heated at 150° C. for 4 hours. The autoclave is then cooled and the contents are filtered to separate the catalyst and blown with nitrogen to remove the hydrogen sulfide formed. The solvent is then removed by heating the mixture under reduced pressure, leaving as the less volatile product an amber oil containing 10.8% of mercapto sulfur. The calculated value for mercaptostearic acid is 10.1% mercapto sulfur.

Example VI

A sulfurized ethylene is prepared by heating a mixture of 60 parts of sulfur in 100 parts of benzene in a steel pressure tube at 175° C. under an ethylene pressure of 1500 to 1700 lbs. per square inch. After five hours heating, the reaction tube is cooled and opened and 10 parts of a finely divided, reduced, nickel-on-kieselguhr catalyst is added. Thereafter the tube is charged with hydrogen at 1000 lbs. per square inch pressure and heated at 160° C. As the reaction proceeds, hydrogen is absorbed and additional hydrogen is added to maintain the total pressure within the range from 2000 to 2600 lbs. per square inch. After 6 hours the tube is cooled and the reaction mixture separated from the catalyst and hydrogen sulfide. Titration of an aliquot of the solution with standard iodine indicates the presence of 0.5 molar equivalent of thiol for each 60 grams of sulfur charged. The products, purified by distillation, include ethanedithiol, B. P. 67° C. at 60 mm., and its mono- and diethyl thioethers boiling at 93° C. at 50 mm. and 64° C. at 4 mm. (approx.) respectively. The combined yield of these products is 52 parts.

The above experiment is repeated with similar results using as the hydrogenation catalyst 5 parts of finely divided pyrophoric iron prepared by extracting the aluminum with boiling caustic solution from a finely ground alloy of iron and aluminum.

Analogously, sulfurized propylene is hydrogenated to give as a principal product propanedithiol-1,2.

Example VII

One hundred parts of sulfurized butene-2 is dissolved in 75 parts of benzene and the solution is charged into an autoclave together with 5 parts of a precipitated cobalt polysulfide catalyst. The autoclave is then charged with hydrogen at superatmospheric pressure and heated with agitation at 150° C. for 4 hours. During the initial two hours, hydrogen is rapidly absorbed and additional hydrogen is added from time to time to maintain the pressure between 1000 and 2400 lbs. per square inch. The operation is continued for an additional 2 hours to insure completion of the reaction, after which the contents of the autoclave are filtered from the catalyst and blown with nitrogen to remove the hydrogen sulfide formed. By distillation at reduced pressure a substantial portion of butanedithiol-2,3 is isolated as a colorless liquid boiling at 86° to 87° C. at 50 mm. pressure. A smaller proportion of higher-boiling sulfur compounds is also obtained.

In a similar manner thiols are obtained by hydrogenating sulfurized butene-1 and isobutylene.

Example VIII

Eighty parts of sulfurized butadiene obtained by heating 27 parts of butadiene with 96 parts of sulphur at 155° C. is dissolved in 100 parts of toluene and charged into an autoclave together with 10 parts of precipitated cobalt polysulfide catalyst. Hydrogen is added at superatmospheric pressure and the autoclave is heated at 150° C. for 4 hours. Additional hydrogen is added occasionally to maintain the pressure in the neighborhood of 2000 lbs. per square inch. After hydrogen absorption ceases, the crude product is filtered from the catalyst and subjected to fractional distillation. Two products are formed predominantly; one boils at 83° C. at atmospheric pressure and contains 25% of total sulfur and 19% of thiol sulfur, and the other fraction boils at 66° to 68° C. at 15 mm. This fraction contains 48% of total sulfur and 43% of thiol sulfur.

Example IX

Seventy-five parts of sulfurized pinene is dissolved in 100 parts of benzene and charged into a hydrogenation autoclave together with 5 parts of molybdenum trisulfide catalyst. Hydrogen is added to an initial pressure of 1000 lbs. per square inch, and the autoclave is heated at 175° C. Hydrogen is absorbed and an additional quantity of this gas is periodically added to maintain the pressure within the range of 1800 to 2400 lbs. per square inch. After 3 hours the reaction is complete, as evidenced by the cessation of hydrogen absorption, after which time the autoclave is cooled and the product is filtered from the catalyst and blown with nitrogen to remove the hydrogen sulfide formed. Titration of an aliquot of the reaction mixture indicates the presence of 0.24 mole of thiol for each 75 grams of sulfurized pinene charged. The solvent is removed by distillation at reduced pressure leaving as the residue crude pinanethiol as an amber colored oil containing 14.1% of thiol sulfur.

In an analogous manner camphanethiols are obtained by hydrogenating sulfurized camphene.

Example X

Fifty parts of styrene is sulfurized by heating in 100 parts of benzene with 46 parts of sulfur in an autoclave at 160° C. for 4 hours. The autoclave is cooled, opened, and 7 parts of precipitated cobalt polysulfide catalyst is added. The autoclave is then charged with hydrogen at 500 lbs. per squqare inch pressure and heated to 125° C. As the pressure decreases due to reaction, additional hydrogen is added to maintain the total pressure within the range from 500 to 1000 lbs. per square inch. After 2 hours no further pressure decrease is noted and the reaction is complete. On working up the reaction mixture by filtration and fractional distillation a mixture of liquid phenylethanethiols is obtained in good yield.

Styrene, sulfurized by reaction with hydrogen polysulfide is converted to phenylethanethiol by hydrogenation under the conditions described in the preceding paragraph.

Example XI

One hundred eighty parts of semi-solid product obtained by treating 154 parts of a mixture consisting of 7 to 10 carbon olefins and 13 to 23 carbon aliphatic ketones with an excess of powdered sulfur is charged into a high-pressure hydrogenation autoclave with 10 parts of cobalt sulfide catalyst and 32 parts of sulfur and hydrogenated for 5 hours at a temperature and pressure, respectively, of 160° C. and 2000 lbs. per square inch. There is a total pressure drop of 2700 lbs. per square inch. On fractionally distilling the product there are obtained 2.9 parts of thiols, B. P. 63° to 83° C. at 24 mm.; 94 parts of thiols, B. P. 83° C. at 24 mm. to 206° C. at 3 mm.; and 23.7 parts of high molecular weight non-volatile thiols.

Example XII

Three thousand sixty parts of alpha-pinene and 770 parts of sulfur are charged into a 4.5 liter steel autoclave and the mixture heated to 150° C. The charge is held at 150° C. for 8 hours and then cooled. One hundred fifty parts of a reduced nickel catalyst is added, the autoclave is swept with hydrogen, and the charge hydrogenated under a pressure of 400 to 500 pounds per square inch of hydrogen at 150° C., until no further pressure decrease occurs. The charge is cooled, and the catalyst separated from the reaction mixture by filtration. Thirty two hundred fifty parts of a product analyzing 14.13% sulfur is obtained. This corresponds to a 64% conversion to pinanethiol.

The above examples merely serve to illustrate representative embodiments of the invention. The various conditions of temperature, pressure, catalysts, reaction times, reactants, etc., are subject to wide variation within the scope of the invention.

In a broad sense, the invention contemplates the hydrogenation of sulfurized ethylenic compounds at elevated temperatures and pressures either batch-wise or by continuous methods. The conditions employed in the hydrogenation of a specific sulfurized ethylenic compound will be governed to a considerable extent by the method selected and by the physical and chemical properties of the material itself. In general, the hydrogenation process of the invention may be carried out in the liquid phase at pressures of at least 10 atmospheres and temperatures above about 75° C. but below 300° C. For batch-wise operations, it has been found particularly convenient to employ pressures between about 10 and 300 atmospheres and temperatures of 100° C. to 200° C. Within the temperature range cited, the lower temperatures are particularly well suited for hydrogenating sulfurized compounds containing two sulfur atoms bonded together, compounds in which a sulfur atom is carried by a carbon atom attached to an aromatic nucleus and compounds in which two or more sulfur atoms are bound to adjacent carbon atoms. The higher temperatures are best suited to the hydrogenation of compounds containing a sulfur atom linked to two carbon atoms not bound to each other. The selection of pressures is chiefly a matter of convenience, in general higher pressures leading to more rapid reaction.

In the practice of this invention, sulfurized ethylenic compounds can be hydrogenated either alone or dissolved in suitable solvents. If solvents are employed, inert materials of the type represented by benzene, toluene, xylene, petroleum ether and ligroin are satisfactory. Alcohols, ethers, e. g. dioxane, and the like are also suitable. Non-solvents such as water may also be employed as the reaction medium. It is preferable, however, to avoid the use of solvents wherever possible in view of the recovery problems and the attendant reduction in space-time yield and equipment efficiency.

Catalysts suitable for use in the process of this invention may be selected from the group of sulfactive materials comprising the sulfides and polysulfides of metals of groups I, VI, and VIII of the periodic table. Examples of catalyst compositions which are particularly efficient are the sulfides of cobalt, nickel, iron, molybdenum, tungsten, and chromium, and, of these, the first four mentioned are preferred because of their high activity. These catalysts are conveniently prepared according to the methods described in the copending applications of F. K. Signaigo, Serial No. 319,241, filed February 16, 1940; and Serial No. 319,242, filed February 16, 1940; and that of B. W. Howk, Serial No. 353,936, filed August 23, 1940. Efficient catalysts can be produced by precipitation methods in which a soluble salt of the metal, e. g., cobalt, is treated with sodium or ammonium polysulfides. Particularly active catalysts are obtained by treating a pyrophoric hydrogenating metal with a sulfiding agent, e. g., hydrogen sulfide or free sulfur, at moderate temperatures as described in the Signaigo application Serial No. 319,242, filed February 16, 1940. The latter process may be carried out conveniently in situ prior to the hyrogenation operation. The selection of a particular catalyst for the hydrogenation of a particular sulfurized ethylenic compound coming within the scope of the invention will depend to some extent on the physical and chemical properties of the starting material and on considerations of temperature, pressure, and the like, employed in the hydrogenation process. Generally speaking, the catalysts of this invention can be employed in the massive state or deposited on a suitable porous supporting material, such as kieselguhr, pumice, and activated carbon, and they may also be used singly or in admixture in various combinations. For liquid phase batch operations, it is preferred to use between about one and fifteen per cent of catalyst in the form of a finely divided powder.

Broadly, this invention comprises the process for producing thiols by hydrogenating sulfurized olefinic compounds. Specific examples of olefins, the sulfurized derivatives of which serve as one class of starting materials for this process are alkenes such as ethylene, proplyene, butene-1, butene-2, isobutylene, isopentene, hexene-1, heptene-3, octene-1, dodecene-8, cetene-1, hexyl-2-decene-1, heptadecone-7, pentatriacontene-17, ethylene polymers and the like; cycloalkenes such as cyclopentene, cyclohexene, unsaturated terpenes, such as pinene and camphene; arylalkenes such as styrene, dihydronaphthalene, indene, acenaphthalene, phenylpropene; diolefins such as allene, butadiene, isoprene, cyclopentadiene, cyclohexadiene, and divinylacetylene. Other olefinic compounds, the sulfurized derivatives of which can also be used include triolein, monovinyl acetylene, methyl methacrylate, methyl undecylenate, diethyl tetrahydrophthalate, oleic acid, undecylenic acid, crotonic acid, cinnamic acid, acrylonitrile, methyl vinyl ketone, crotonaldehyde, vinyl ethers, 2-chlorobutadiene-1,3,2-chlorobutene-2, and the like.

The sulfurized ethylenic hydrocarbons that may be hydrogenated to thiols according to this invention are characterized as the class of organic sulfur compounds formed by the reaction of a compound having an ethylenic group with a sulfurizing agent. Among the sulfurizing agents that may be used in this connection, sulfur is especially important because of its effectiveness and low cost. Other sulfurizing agents may be employed, however, and these generally contain at least two sulfur atoms bound to each other. Examples of such materials are inorganic and organic polysulfides such as sodium polysulfide, diethyl tetrasulfide, hydrogen disulfide and sulfur monochloride. Catalysts such as the chlorides of Al, Fe and Zn may be employed for the sulfurization process but these are not essential in most cases. The structure of the sulfurized ethylenic compounds has not been determined in most instances but the partial formulas listed below illustrate some of the more likely possibilities:

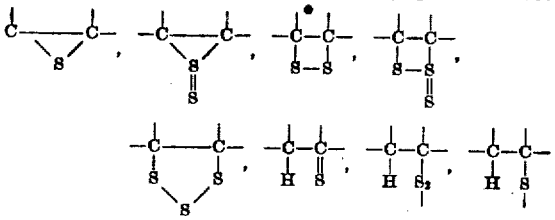

In addition to monomeric compounds the sulfurized products may consist of dimeric and polymeric compounds.

Thiols prepared by the above-described process are valuable intermediates for the synthesis of surface-active agents and resins, for addition to lubricating oils, and for a wide variety of other uses such as modifying agents for natural and synthetic rubbers. Other outlets are to be found in the stabilization of gasoline and for conversion to valuable derivatives such as sulfides, disulfides, sulfoxides, sulfones, and the like, for which many uses are known to the art.

Having described in detail the preferred embodiments of this invention, it is to be understood that it is not limited to the specific embodiments thereof, except as defined in the following claims.

We claim:

1. A process for the production of thiols which comprises catalytically hydrogenating a sulfurized ethylenic compound in the presence of a sulfactive hydrogenation catalyst.

2. The process in accordance with claim 1 characterized in that the reaction is carried out in the liquid phase.

3. The process in accordance with claim 1 characterized in that the reaction is carried out at a temperature from about 75° C. to about 300° C. and under a pressure in excess of 10 atmospheres.

4. The process in accordance with claim 1 characterized in that the sulfactive hydrogenation catalyst is one selected from the sulfides of the ferrous metal group.

5. The process of claim 1 characterized in that the catalyst is a sulfactive base metal sulfide.

6. The process of claim 1 characterized in that the catalyst is a sulfide selected from the group consisting of iron, nickel, cobalt, molybdenum, and chromium.

7. The process of claim 1 characterized in that the catalyst is a sulfide of cobalt.

8. The process of claim 1 characterized in that the catalyst is a sulfide of nickel.

9. The process of claim 1 characterized in that the catalyst is a sulfide of molybdenum.

10. The process of claim 1 characterized in that the reaction is carried out at temperatures of from 100° C. to 200° C.

11. The process of claim 1 characterized in that the reaction is carried out at pressures of from 10 to 300 atmospheres.

12. The process of claim 1 characterized in that the process is carried out at temperatures of from 100° C. to 200° C. and at pressures of from 10 to 300 atmospheres.

13. The process of claim 1 characterized in that the compound hydrogenated is a sulfurized long-chain ethylenic hydrocarbon.

14. The process of claim 1 characterized in that the compound hydrogenated is a sulfurized normally gaseous olefin.

15. The process of claim 1 characterized in that the compound hydrogenated is sulfurized pentadecene-7.

16. The process for the production of thiols which comprises catalytically hydrogenating a sulfurized ethylenic hydrocarbon in the presence of a sulfactive hydrogenation catalyst.

17. A process for the production of ethanedithiol which comprises catalytically hydrogenating sulfurized ethylene in the presence of a sulfactive hydrogenation catalyst.

18. A process for the production of a four-carbon thiol which comprises catalytically hydrogenating a sulfurized four-carbon unsaturated hydrocarbon in the presence of a sulfactive hydrogenation catalyst.

19. A process for the production of thiols which comprise catalytically hydrogenating a sulfurized ethylenic compound at a temperature in excess of 75° C. in the presence of a sulfactive hydrogenation catalyst.

20. A process for the production of thiols which comprises catalytically hydrogenating a sulfurized ethylenic compound under a pressure of at least 10 atmospheres in the presence of a sulfactive hydrogenation catalyst.

21. A process for the production of thiols which comprises catalytically hydrogenating a sulfurized ethylenic compound under a pressure of at least 10 atmospheres and a temperature in excess of 75° C. in the presence of a sulfactive hydrogenation catalyst.

22. In the process of producing thiols the step of bringing hydrogen and a sulfurized ethylenic compound into contact with a sulfactive hydrogenation catalyst.

23. The process in accordance with claim 22 characterized in that the sulfurized ethylenic compound is a sulfurized olefinic hydrocarbon.

24. The process in accordance with claim 22 characterized in that the sulfactive hydrogenation catalyst is a metal sulfide formed in situ by bringing the sulfurized ethylenic compound into contact with a catalytically active metal.

25. The process of claim 18 in which the four-carbon unsaturated hydrocarbon is butene-2.

26. In a process for the production of thiols, the successive steps of reacting an ethylenic compound with a sulfurizing agent whereby to produce a sulfurized ethylenic compound and thereafter catalytically hydrogenating said sulfurized ethylenic compound under pressure in the presence of a sulfactive hydrogenation catalyst.

27. The process of claim 26 in which the sulfurizing agent is selected from the group comprising sulfur and inorganic and organic polysulfides.

28. The process of claim 26 in which the ethylenic compound is ethylenic hydrocarbon.

WILBUR A. LAZIER.
FRANK K. SIGNAIGO.
JAMES H. WERNTZ.

Certificate of Correction

Patent No. 2,402,643.　　　　　　　　　　　　　　　　　　　　June 25, 1946.

WILBUR A. LAZIER ET AL.

It is hereby certified that errors appear in the printed specification of the above numbered patent requiring correction as follows: Column 1, line 30, for "dithols" read *dithiols*; column 4, line 40, Example VI, for "60 mm" read *50 mm*; column 9, line 31, claim 19, for "comprise" read *comprises*; column 10, line 34, claim 28, before "ethylenic" insert *an*; and that the said Letters Patent should be read with these corrections therein that the same may conform to the record of the case in the Patent Office.

Signed and sealed this 24th day of September, A. D. 1946.

[SEAL]

LESLIE FRAZER,
*First Assistant Commissioner of Patents.*

11. The process of claim 1 characterized in that the reaction is carried out at pressures of from 10 to 300 atmospheres.

12. The process of claim 1 characterized in that the process is carried out at temperatures of from 100° C. to 200° C. and at pressures of from 10 to 300 atmospheres.

13. The process of claim 1 characterized in that the compound hydrogenated is a sulfurized long-chain ethylenic hydrocarbon.

14. The process of claim 1 characterized in that the compound hydrogenated is a sulfurized normally gaseous olefin.

15. The process of claim 1 characterized in that the compound hydrogenated is sulfurized pentadecene-7.

16. The process for the production of thiols which comprises catalytically hydrogenating a sulfurized ethylenic hydrocarbon in the presence of a sulfactive hydrogenation catalyst.

17. A process for the production of ethanedithiol which comprises catalytically hydrogenating sulfurized ethylene in the presence of a sulfactive hydrogenation catalyst.

18. A process for the production of a four-carbon thiol which comprises catalytically hydrogenating a sulfurized four-carbon unsaturated hydrocarbon in the presence of a sulfactive hydrogenation catalyst.

19. A process for the production of thiols which comprise catalytically hydrogenating a sulfurized ethylenic compound at a temperature in excess of 75° C. in the presence of a sulfactive hydrogenation catalyst.

20. A process for the production of thiols which comprises catalytically hydrogenating a sulfurized ethylenic compound under a pressure of at least 10 atmospheres in the presence of a sulfactive hydrogenation catalyst.

21. A process for the production of thiols which comprises catalytically hydrogenating a sulfurized ethylenic compound under a pressure of at least 10 atmospheres and a temperature in excess of 75° C. in the presence of a sulfactive hydrogenation catalyst.

22. In the process of producing thiols the step of bringing hydrogen and a sulfurized ethylenic compound into contact with a sulfactive hydrogenation catalyst.

23. The process in accordance with claim 22 characterized in that the sulfurized ethylenic compound is a sulfurized olefinic hydrocarbon.

24. The process in accordance with claim 22 characterized in that the sulfactive hydrogenation catalyst is a metal sulfide formed in situ by bringing the sulfurized ethylenic compound into contact with a catalytically active metal.

25. The process of claim 18 in which the four-carbon unsaturated hydrocarbon is butene-2.

26. In a process for the production of thiols, the successive steps of reacting an ethylenic compound with a sulfurizing agent whereby to produce a sulfurized ethylenic compound and thereafter catalytically hydrogenating said sulfurized ethylenic compound under pressure in the presence of a sulfactive hydrogenation catalyst.

27. The process of claim 26 in which the sulfurizing agent is selected from the group comprising sulfur and inorganic and organic polysulfides.

28. The process of claim 26 in which the ethylenic compound is ethylenic hydrocarbon.

WILBUR A. LAZIER.
FRANK K. SIGNAIGO.
JAMES H. WERNTZ.

Certificate of Correction

Patent No. 2,402,643.   June 25, 1946.

WILBUR A. LAZIER ET AL.

It is hereby certified that errors appear in the printed specification of the above numbered patent requiring correction as follows: Column 1, line 30, for "dithols" read *dithiols*; column 4, line 40, Example VI, for "60 mm" read *50 mm*; column 9, line 31, claim 19, for "comprise" read *comprises*; column 10, line 34, claim 28, before "ethylenic" insert *an*; and that the said Letters Patent should be read with these corrections therein that the same may conform to the record of the case in the Patent Office.

Signed and sealed this 24th day of September, A. D. 1946.

[SEAL]

LESLIE FRAZER,
*First Assistant Commissioner of Patents.*